United States Patent
Aufdermarsh, Jr. et al.

[15] 3,674,721

[45] July 4, 1972

[54] PROCESS FOR PREPARING FLEXIBLE POLYURETHANE FOAMS AND COATINGS

[72] Inventors: Carl Albert Aufdermarsh, Jr.; Adolf Wojciech Fogiel, both of Wilmington, Del.

[73] Assignee: E. I. du Pont de Nemours and Company, Wilmington, Del.

[22] Filed: Feb. 3, 1970

[21] Appl. No.: 8,421

Related U.S. Application Data

[63] Continuation-in-part of Ser. No. 821,085, May 1, 1969, abandoned, which is a continuation-in-part of Ser. No. 765,012, Oct. 4, 1968, abandoned.

[52] U.S. Cl..............260/2.5 AC, 260/2.5 AT, 260/75 NC, 260/75 NT, 260/77.5 AC, 260/77.5 AT
[51] Int. Cl.....................C08g 22/34, C08g 22/44
[58] Field of Search...............260/2.5 A, 2.5 AC, 77.5 AC, 260/75 NC, 2.5 AT, 75 NT, 77.5 AT

[56] References Cited

UNITED STATES PATENTS

| | | | |
|---|---|---|---|
| 3,152,094 | 10/1964 | Erner et al. | 260/2.5 |
| T858,022 | 1/1969 | Fogiel | 260/2.5 |
| 3,436,361 | 4/1969 | Wooster | 260/77.5 |
| 3,252,945 | 5/1966 | Ugi et al. | 260/77.5 |

FOREIGN PATENTS OR APPLICATIONS

| | | | |
|---|---|---|---|
| 712,183 | 4/1968 | Belgium | 260/2.5 |

*Primary Examiner*—Donald E. Czaja
*Assistant Examiner*—Eugene C. Rzucidlo
*Attorney*—Vernon R. Rice

[57] ABSTRACT

Polyurethane foams and coatings. The foams are prepared from organic polyisocyanates, polyols and water in quasi-prepolymer, full prepolymer or one-shot systems using a substituted amidine catalyst. The coatings are conventional isocyanato-terminated polyurethane prepolymers cured with moisture in the presence of a substituted amidine.

13 Claims, No Drawings

1

PROCESS FOR PREPARING FLEXIBLE POLYURETHANE FOAMS AND COATINGS

BACKGROUND OF THE INVENTION

This application is a continuation-in-part of copending application Ser. No. 821,085 filed May 1, 1969 which is a continuation-in-part of copending application Ser. No. 765,012 filed Oct. 4, 1968 both of which applications are now abandoned.

The manufacture of flexible cellular polyurethane products or foams and polyurethane moisture-cure coatings are well-established industries. Flexible foams are prepared by reacting an organic isocyanate with one or more active hydrogen-containing compounds such as polyether polyols, polyester polyols or polyamines in the presence of a blowing agent. Moisture-cure polyurethane coatings are solutions of isocyanato-terminated prepolymers which cure or dry on exposure to air by reaction of free isocyanato groups with atmospheric moisture.

In recent years a large body of art relating to the preparation of flexible foams has developed. For the most part, this information relates to the use of aromatic diisocyanates, particularly tolylene diisocyanate. While flexible foams which have excellent physical properties can be readily prepared from aromatic isocyanates, they are generally subject to discoloration upon exposure to heat and light. Discoloration is especially troublesome in applications where aesthetic qualities are important such as in wearing apparel, drapery linings and furniture.

It is known that polyurethane products based on aliphatic isocyanates are more resistant to discoloration than those prepared from aromatic isocyanates. The skilled worker would therefore be led to the use of aliphatic isocyanates in the preparation of non-discoloring foams. However, the use of aliphatic isocyanates in preparing flexible foams has not been successful in terms of process operability and foam properties. Thus, when tolylene diisocyanate has been replaced with aliphatic diisocyanates in commercial processes regularly used for flexible urethane foam manufacture, good results have not been achieved even though increased catalyst concentrations are used to compensate for the lower reactivity of aliphatic isocyanates. To illustrate: U.S. Pat. No. 3,352,803 to Hogg et al. discloses the use of conventional foam catalysts in preparing foams from an aliphatic diisocyanate, a triol, water and a source of hydrogen peroxide. In order to foam and cure, the reactants must be heated in an oven for an extended time. The resulting foams, as taught by the examples, have closed cells and high densities (4.0 lbs./cu.ft.). French Pat. No. 1,481,815 discloses a process for preparing flexible foams in which a polyol, water and an aliphatic diisocyanate are mixed in the presence of an organo-metallic catalyst. The time required for foaming is relatively long (about 7 minutes) unless heat is supplied, and the densities of the disclosed foams are about 4 lbs./cu.ft. or higher.

In contrast, high quality tolylene diisocyanate open-cell foams having densities of about 2 lbs./cu.ft. can be prepared by prepolymer or one-shot processes in which the ingredients are mixed at about room temperature, and within practically short periods, are fully formed and sufficiently cured to permit handling of the foams. Such processes readily lend themselves to efficient continuous foam production. As discussed above, however, such aromatic isocyanate foams are subject to discoloration.

Aliphatic isocyanate-based moisture-cure polyurethane coatings are achieving widespread use in applications such as floor coverings and finishing for wood because of their resistance to discoloration. Their acceptance, however, has been limited because of the sluggishness of aliphatic isocyanato groups in reacting with atmospheric water to cure and harden the coating.

SUMMARY OF THE INVENTION

This invention provides processes for preparing open-cell, flexible polyurethane foams and aliphatic isocyanate-based polyurethane moisture-cure coatings. The foams are prepared by reacting a polyester or polyether polyol having an average equivalent weight of at least about 500 and 1–10 parts by weight of water per 100 parts of polyol with about 0.7–1.3 equivalents of an organic polyisocyanate per equivalent of water plus polyol in the presence of 0.02–10 parts by weight per 100 parts of polyol plus polyisocyanate of at least one substitute amidine of the formula

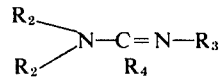

wherein $R_1$ and $R_2$ are independently $C_1$–$C_4$ alkyl or substituted $C_1$–$C_4$ alkyl, $R_3$ is $C_1$–$C_{18}$ alkyl or substituted $C_1$–$C_{18}$ alkyl, and $R_4$ is hydrogen, $C_1$–$C_5$ alkyl or substituted $C_1$–$C_5$ alkyl, wherein the substituents in each case are at least one $C_1$–$C_4$ alkoxy group; or the radicals in one or two of the pairs $R_1$–$R_2$, $R_1$–$R_3$, $R_1$–$R_4$, $R_2$–$R_3$, $R_2$–$R_4$ and $R_3$–$R_4$ are joined together to form one or two 5 to 9 membered rings consisting of carbon atoms and not more than two hetero atoms, including the amidine nitrogen atoms, from the group consisting of nitrogen, oxygen and sulfur.

A preferred embodiment is the preparation of nondiscoloring, open-cell flexible foam when the organic polyisocyanate used is an aliphatic polyisocyanate.

The moisture-cure coatings are prepared by reacting about 1.4–2.1 equivalents of an aliphatic polyisocyanate with about 1 equivalent of at least one polyol to prepare an isocyanato-terminated prepolymer, introducing about 0.05–2.0 percent by weight, based on the weight of the prepolymer plus added solvents, of a substituted amidine catalyst as described above and applying the solution of said prepolymer and catalyst in an inert solvent to a substrate where upon the free isocyanato groups react with atmospheric water to cure the coating.

DETAILED DESCRIPTION

The term "equivalent" means chemical equivalent weight. The stoichiometry and equivalents of materials indicated herein are based solely on the reaction of hydroxy groups and water with isocyanato groups to prepare the foams and coatings of this invention and assume, as is well accepted in the art, that one free hydroxy group reacts with one free isocyanato group and one molecule of water reacts with two free isocyanato groups.

The catalysts used in this invention are substituted amidines of the formula

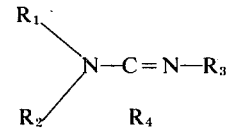

wherein $R_1$ and $R_2$ are independently $C_1$–$C_4$ alkyl or substituted $C_1$–$C_4$ alkyl wherein the substituents are $C_1$–$C_4$ alkoxy, $R_3$ is $C_1$–$C_{18}$ alkyl, and $R_4$ is hydrogen or $C_1$–$C_5$ alkyl, or the radicals in one or two of the pairs $R_1$–$R_2$, $R_1$–$R_3$, $R_1$–$R_4$, $R_2$–$R_3$, $R_2$–$R_4$, $R_3$–$R_4$ are joined together to form a 5 to 9 membered ring consisting of carbon atoms and not more than two hetero atoms, including amidine nitrogen atoms, from the group consisting of nitrogen, oxygen and sulfur. Any of the groups $R_1$, $R_2$, $R_3$ or $R_4$ can bear one or more $C_1$–$C_4$ alkoxy groups.

A preferred class of amidines for use in preparing foams is that in which one of the pairs $R_1$–$R_3$ or $R_2$–$R_3$ forms a 5 to 7 membered ring consisting of the two amidine nitrogen atoms and carbon atoms and one of the pairs $R_2$–$R_4$ or $R_1$–$R_4$ forms a 5 to 9 membered ring consisting of one amidine nitrogen atom and carbon atoms. This class of amidines can be represented by the formula

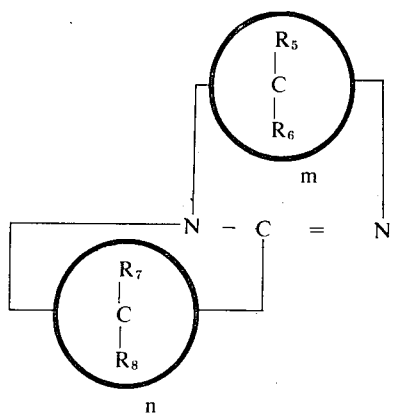

wherein $R_5$, $R_6$, $R_7$ and $R_8$ are independently hydrogen or $C_1$–$C_4$ alkyl, $m$ is an integer from 2 to 4 and $n$ is an integer from 3 to 7. These amidines are particularly active in promoting the water-isocyanate reaction and the resulting foams have superior physical properties. Within this class the compounds 1,5-diazabicyclo[4.3.0]nonene-5 and 1,8-diazabicyclo[5.4.0]undecene-7 are especially preferred. Other representative compounds within this class include 1,4-diazabicyclo[3.3.0]octene-4; 2-methyl-1,5-diazabicyclo[4.3.0]nonene-5; 2,7,8-trimethyl-1,5-diazabicyclo[4.3.0]nonene-5; 2-butyl-1,5-diazabicyclo-[4.3.0]nonene-5; and 1,9-diazabicyclo[6.5.0]tridecene-8. The compound N'-cyclohexyl-N,N-dimethylformamidine is also preferred because of its activity and the high quality foams resulting from its use.

Other representative amidines useful in this invention are N'-methyl-N,N-di-n-butylacetamidine, N'-octadecyl-N,N-dimethylformamidine, N'-cyclohexyl-N,N-dimethylvaleramidine, 1-methyl-2-cyclohexyliminopyrrolidine, 3-butyl-3,4,5,6-tetrahydropyrimidine, N-(hexyliminomethyl)-morpholine, N-[α-(decylimino)ethyl]pyrrolidine, N'-decyl-N,N-di-β-ethoxyethyl-formamidine, N'-dodecyl-N,N-dimethylformamidine and N'-cyclohexyl-N,N-dimethylacetamidine. The amidines wherein $R_1$ and $R_2$ are methyl, $R_4$ is hydrogen and $R_3$ is $C_8$–$C_{18}$ alkyl or cycloalkyl are new compounds.

The amidine catalysts can be prepared by condensing primary aliphatic amines with amides in which the amide nitrogen is completely alkylated. A simplified (in that the formation of intermediates is not shown) general representation of this reaction is as follows:

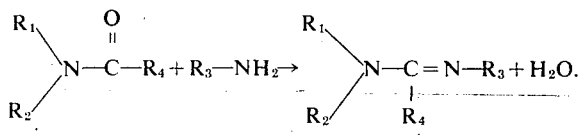

The alkylated amide and primary amine can be contained within the same molecule in which case ring formation accompanies the condensation. Specific procedures for carrying out this condensation can be found in Ber. 92, 837, (1959) wherein the preparation of N'-cyclohexyl-N,N-dimethylformamidine from cyclohexyl amine and N,N-dimethylformamide is described and in Ber. 99, 2015 (1966) wherein the preparation of 1,5-diazabicyclo[4.3.0]nonene-5 by ring closure of 1-[3-aminopropyl]-pyrrolidone-2 is described. These specific procedures are generally applicable to the preparation of all the amidines used in this invention. Preparation of the new compound N'-decyl-N,N-dimethylformamidine is described in Example 10 herein.

In preparing foams the substituted amidine catalyst is employed in the amount of about 0.02–10 parts by weight per 100 parts if isocyanate plus polyol. The exact amount to be used depends on the reactivity of the isocyanate used, the scale of the foaming operation, and the rate of reaction desired, but can be routinely determined by one skilled in the art. When a foam is prepared from 4,4'-methylenebis(cyclohexyl isocyanate) batchwise on a small scale, about 0.5–2 parts by weight of 1,5-diazabicyclo-[4.3.0]nonene-5 (DEN) per 100 parts of isocyanate and polyol is necessary to give a foam rise time of about 2 minutes. In larger scale continuous operation using a foam machine, the amount of DBN required is reduced to 0.1–0.5 parts.

The substituted amidine catalysts are very active in catalyzing the water-aliphatic isocyanate reaction. The water-isocyanate reaction is preferentially catalyzed when both polyol and water are present in the same system. Thus, the formation of urea groups is favored over the formation of urethane groups. The active catalysis of the water-aliphatic isocyanate reaction is an important aspect of this invention since heretofore the principal deterrent to successful preparation of aliphatic isocyanate foams has been that the water-aliphatic isocyanate reaction proceeded too slowly to effectively expand the foam formulation. Consequently, the resulting foams have been of high density and were slow in forming. This has been true even when prior art catalysts were employed which vigorously promote the water-aromatic isocyanate reaction. The catalysts of this invention are also effective in catalyzing the water-aromatic isocyanate reaction and thus can be used in the preparation of aromatic isocyanate-based foams by prepolymer, quasi-prepolymer and one-shot techniques. Tin catalysts or other catalysts for urethane formation are required in addition to the substituted amidine in the preparation of foams by one-shot processes. Representative catalysts which promote the formation of urethanes are tertiary amines such as triethylene diamine, organotin compounds such as dibutyl tin dilaurate, and the organic acid salts of divalent tin such as stannous octoate. When the substituted amidines described above are employed in water-blown prepolymer, quasi-prepolymer or one-shot systems, the formulation is expanded rapidly to form foams of low density in a reasonably short foaming time.

The polyols which can be used in foam preparation are the polyalkyleneether and polyester polyols having an average equivalent weight of at least about 500. The preferred polyol equivalent weight is from about 900–2,000. It is also preferred that the hydroxy groups of the polyol be attached to primary carbon atoms because of their greater reactivity; however, secondary hydroxy groups can also be present. This is particularly true in preparing foams by quasi-prepolymer or one-shot procedures.

Representative hydroxy-terminated polyethers include polyalkyleneether polyols prepared by polymerization or copolymerization of cyclic ethers such as ethylene oxide, propylene oxide, trimethylene oxide, and tetrahydrofuran, or by the polymerization or copolymerization of one of these cyclic ethers in the presence of polyhydric alcohols such as alkanediols or aliphatic polyols, such as ethylene glycol, propylene glycol, 1,3-butanediol, glycerol, 2-ethyl-2-(hydroxymethyl)-1,3-propanediol (commonly called trimethylolpropane) or sorbitol. Suitable polyesters include the hydroxy-terminated polyesters prepared from one or more dicarboxylic acids and one or more aliphatic dihydroxy compounds. Representative examples of dicarboxylic acids which can be used include succinic acid, glutaric acid, adipic acid and benzenedicarboxylic acids. Examples of suitable hydroxy compounds are ethylene glycol, 1,2-propylene glycol, 1,3-propylene glycol, 1,3-butanediol, 1,4-butanediol, diethylene glycol, dipropylene glycol, 2,2-diemthyl-1,3-propanediol, and 1,6-hexanediol. Polyesters having more than two hydroxy groups can be prepared similarly by using one or more reactants having more than two functional groups. Mixtures of polyols can also be used. Polyether and polyester polyols containing at least about 2.2 hydroxy groups per molecule give best results in terms of good physical properties of the foams and are therefore preferred.

The term "aliphatic polyisocyanate" as used herein includes any organic polyisocyanate in which the isocyanato groups are attached to saturated carbon atoms. Cycloaliphatic polyisocyanates and polyisocyanates containing aromatic rings such as xylylene diisocyanate can be used provided they meet the limitation stated above. Representative aliphatic polyisocyanates include 1,4-tetramethylene diisocyanate, 1,6-hexamethylene diisocyanate, 2,2,4-trimethyl-1,6-hexamethylene diisocyanate, m- and p-xylylene diisocyanates, $\alpha,\alpha,\alpha',\alpha'$-tetramethyl-p-xylylene diisocyanate, 3-isocyanatomethyl-3,5,5-trimethylcyclohexyl isocyanate, phenylenebis(2-ethyl isocyanate), 4-methyl-1,3-cyclohexylene diisocyanate, 2-methyl-1,3-cyclohexylene diisocyanate, 4,4'-memthylenebis(cyclohexyl isocyanate) and 2,4'-methylenebis(cyclohexyl isocyanate). In addition, aliphatic diisocyanates which contain ester linkages can be used. Illustrative of such isocyanates are bis(2-isocyanatoethyl)carbonate, bis(2-isocyanatoethyl)fumarate, bis(2-isocyanatoethyl)-4-cyclohexene-1,2-dicarboxylate and lower alkyl esters of 2,5-diisocyanatovaleric acid. Polyisocyanates containing three or more isocyanato groups per molecule such as 2,4-bis(4-isocyanatocyclohexylmethyl)cyclohexyl isocyanate can also be used but preferably only in small quantities in combination with diisocyanates.

The preferred isocyanate is 4,4'-methylenebis(cyclohexyl isocyanate) (PICM) because of the high quality foams it gives and its relatively low volatility. Isomeric mixtures of PICM which are liquid at room temperature are particularly preferred because of their handling convenience in foam formulations. Such liquid PICM mixtures contain less than 26 percent trans-trans isomer and less than 75 percent cis-cis isomer. They are prepared by phosgenating the corresponding 4,4'-methylenebis(cyclohexyl amine) (PACM) isomeric mixtures by procedures well known in the art, cf. U.S. Pat. Nos. 2,644,007, 2,680,127 and 2,908,703. The PACM isomer mixtures which upon phosgenation yield liquid PICM are also well known in the art, and can be obtained by hydrogenation of methylenedianiline under mild conditions and/or by fractional crystallization of PACM isomer mixtures in the presence of water and alcohols. In general, polyisocyanates which are liquid at room temperature are preferred since the process of this invention is most conveniently operated when all the materials are at or slightly above room temperature. If the isocyanate used is a solid at room temperature, the reaction must be carried out at a higher temperature at which the isocyanate is liquid.

As indicated hereinbefore, the present process is also applicable to the preparation of foams derived from aromatic polyisocyanates of which 2,4- and 2,6- tolylene diisocyanate and mixtures thereof are preferred. Other representative aromatic polyisocyanates are 4,4'-methylenebis(phenyl isocyanate) and phenylene dissocyanates. Additional useful aromatic diisocyanates are listed in U.S. Pat. No. 3,080,329.

Foams can be prepared by the process of this invention by substantially conventional techniques well known in the art for the preparation of water-blown flexible polyurethane foams. One-shot, quasi-prepolymer and prepolymer procedures can be employed. These variations are well known and are described in Chapter VII of "Polyurethanes: Chemistry and Technology," Part II, Saunders and Frisch, Interscience Publishers, 1964.

A preferred procedure for making foams by this invention, which is particularly useful for foams based on aliphatic diisocyanates, employs two stages. In step 1 an isocyanato-terminated prepolymer is prepared by reacting about one equivalent of the polyol with about 2.0–10.5 ($x$) equivalents of aliphatic isocyanato groups. The prepolymer can be prepared by conventional techniques used in preparing aromatic isocyanate foams, although allowance should be made for the lower reactivity of aliphatic isocyanates. If less isocyanate than that indicated above is used, the viscosity of the prepolymer may be too high for proper foaming. This is particularly true with polyester polyols for which the ratio of isocyanato groups to hydroxy groups is preferably above 2.5. Mixing of the polyisocyanate and polyol should be carried out without undue delay. It is desirable to add the polyol to the polyisocyanate to minimize chain-extension and maintain the prepolymer viscosity at a low level. The course of prepolymer formation can be conveniently followed by periodically determining the isocyanato group concentration of the reaction mixture until a constant level is reached. Heating the mixture is advisable to accelerate prepolymer formation. Temperatures of about 70°–110° C. are preferred. Polyols containing primary hydroxyls require a reaction time of about 1–12 hours at 80°–100° C. for prepolymer formation whereas polyols with secondary hydroxyls require at least about 2 to 3 times as long. Prepolymer formation can also be hastened by adding catalysts such as dibutyltin dilaurate, fatty acid salts of zinc and lead and triethylene diamine.

In step 2 of the preferred processes of this invention, the prepolymer from step 1 is mixed with from about 0–10 parts by weight of water per 100 parts of total polyol used, additional aliphatic polyisocyanate ($y$ equivalents) if needed, and from about 0.02–10 parts by weight of the catalyst per 100 parts by weight of isocyanate plus polyol used in the process. Sufficient aliphatic isocyanate is added in steps 1 and 2 ($x + y$ equivalents) to give from about 0.7–1.3 equivalents of isocyanato groups per equivalent of hydroxy groups plus water used in the process. Thus, if sufficient isocyanate is added in step 1 to meet this requirement there is no need for additional isocyanate in step 2. A variety of procedures can be used in adding the ingredients in step 2 to the prepolymer. The isocyanate can be first added in a separate step followed by addition of the polyol, water and catalyst, or all of the components can be added simultaneously. If desired, all of the components but the catalyst can be added and allowed to stand for a short time (usually not longer than a few minutes) followed by addition of the catalyst. Whatever the procedure used, once the catalyst has been mixed with the prepolymer, all other components should also be present.

When the polyol is a polyester, it is preferred to employ the quasi-prepolymer process in which the polyol is added in both steps 1 and 2, otherwise, the prepolymer becomes too viscous for convenient handling. Preferably at least about 40–90 percent by weight of the polyester is added in step 1. It is generally advantageous to add less than all of the isocyanate in step 1 to allow later minor adjustments of the isocyanate content.

As indicated above the two-stage prepolymer and quasi-prepolymer techniques are preferred as the resulting foams having superior physical properties to those prepared by the one-shot process in which the polyisocyanate, water and polyol are reacted substantially simultaneously.

In foam preparation the amount of water to be used will be largely dictated by the density of foam desired. Generally, about 2–5 parts by weight of water per 100 parts of polyol are preferred which gives foam of about 2 lb./cu.ft. density. Greater amounts of water yield foams of lower density and lesser amounts give foams of greater density as is well known in the art. If desired, small amounts of of the blowing agents such as trichlorofluoromethane and methylene chloride can be used in conjunction with water to expand the foams. In such cases the amount of water needed to yield a foam of a given density will be slightly less; however, the amount of water used should not be less than about 1 part by weight per 100 parts of polyol.

In preparing foams by the process of this invention it is usually desirable to employ a surfactant or combination of surfactant to obtain uniform cell structure in the final product. Polydimethylsiloxanepolyalkyleneether block copolymers which are regularly employed in the preparation of polyurethane foams are suitable in most instances when used at levels of about 0.1 to 3.0 parts per 100 parts of polyol. Either hydrolytically stable block copolymers of which $C_4H_9O(C_2$ $H_4O)_{46}C_3H_6O)_{34}CH_2CH(OH)CH_2O(CH_2)_3Si(CH_3)_2O-[Si(CH_3)_2O]_{20}Si(CH_3)_2-(CH_2)_3OCH_2CH(OH)CH_2(OC_3H_6)_{34}-(OC_2H_4)_{46}OC_4H_9$ is illustrative (disclosed in Canadian Pat. No. 669,881) or block copolymers subject to slow hydrolysis such as

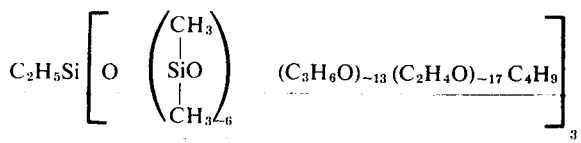

disclosed in U.S. Pat. No. 2,834,748 are satisfactory. Other nonionic surfactants which may be useful on occasion include materials such as polyoxypropylene-polyoxyethylene block copolymers, polyethoxylated vegetable oils and polyethoxylated monoesters of sorbitol and fatty acids. Anionic surfactants of which sulfonated castor oil and sodium dioctyl sulfosuccinate are illustrative, are also useful, particularly in polyester systems. In addition, small amounts of silicone oils, such as polydimethylsiloxane, 50 centistoke grade, can be used to improve cell opening, but they are not required.

Other additives such as antioxidants, stabilizers, U.V.-screening agents, plasticizers, pigments and fillers can be added to the foam formulations of this process if desired. One can also employ conventional amine or tin foam catalysts in this process along with the required substituted guanidine catalyst. Cell regulators, such as N,N-dimethylformamide, N-methylpyrrolidone-2, tetramethylene sulfone, and dimethylsulfoxide may be useful in increasing the opening of the cells of the foams. The use of cell regulators in preparing open-cell, skeletal foams is described in U.S. Pat. No. 3,210,300 to Leibu and Tufts, issued 10/5/65. Other conventional steps such as heating to improve the compression set can also be employed.

The process of this invention is useful for the preparation of flexible foams in general and more particularly makes possible the efficient continuous preparation of flexible foams based on aliphatic polyisocyanates. Because of the activity of the catalyst employed, the ingredients can be mixed at room temperature. Foam formation can be completed about as rapidly for aliphatic diisocyanates as for tolylene diisocyanate systems, i.e., about 2 minutes. Crushing is not necessary to obtain open-cell foams. Foams having densities of about 2 lb./cu.ft. or even less can be readily prepared. Oven curing is not required to achieve good properties including tensile strength and compression set when the preferred catalysts are used to prepare the foams. The aliphatic polyisocyanate-based foams are also nondiscoloring when the components other than the aliphatic polyisocyanate used are nondiscoloring.

Moisture-cure, one-package polyurethane coating compositions generally are solutions of isocyanato-terminated prepolymers which cure or dry on exposure to air by reaction of free isocyanato groups with atmospheric water. By properly selecting the polyols used in preparing the prepolymer and the ratio of isocyanato groups to hydroxyl groups, the physical properties of the dry film produced can be varied over a considerable range. In moisture-cure coating compositions based on aliphatic isocyanates, the time required for drying is frequently so extended that the use of such coatings is inconvenient. Because of the exceptional capacity of the catalysts of this invention to catalyze the reaction of alphatic isocyanato groups with water, the rate of drying or curing of moisture-cure coatings derived from aliphatic polyisocyanates can be greatly accelerated by adding relatively minor amounts of the substituted amidines described hereinbefore.

Any of the aliphatic polyisocyanates described hereinbefore can be used to prepare moisture-cure coatings according to this invention.

The diols and polyols which can be used include a wide range of materials well-known to those skilled in the art of polyurethane coatings. Included are the polyalkylene ether polyols and polyester polyols both of which can be obtained as described above. These polyols should generally meet the functionality and equivalent weight requirements indicated below. Non-polymeric low molecular weight polyols, i.e., molecular weight below about 350 can be used in admixture with polymeric polyols to advantage on occasion. Representative of such materials are ethylene glycol, propylene glycol, diethylene glycol, dipropylene glycol, glycerine, trimethylol propane, hexanetriol-1,2,6-and pentaerythritol.

In preparing moisture-cure coatings, about 1.4-2.1 equivalents of polyisocyanate is used per equivalent of polyol. The functionality of the polyol or mixture of polyols used is generally between 2 and 4 and preferably between 2 and 3. If an isocyanate of functionality greater than 2 is used, the functionality of the polyols usually should be adjusted downward. The average equivalent weight of the polyols should be in the range of about 90-560.

The coating compositions can be prepared by adding an aliphatic polyisocyanate to an anhydrous mixture of polyols and solvent and heating to temperatures up to about 100° C. until the reaction is substantially complete. The order of additions can be reversed if desired. Addition of solvents can be postponed until the prepolymer is formed. Formation of the prepolymer can be hastened by adding small amounts (0.001-0.01 percent) of organo-tin catalysts such as dibutyltin dilaurate. Any relatively volatile inert organic liquid in which the reactants and products are soluble is suitable as a solvent. By "inert" is meant that the various reactants and products will not react with the solvent. Representative solvents are aromatic hydrocarbons such as toluene and xylene, esters such as ethyl acetate and β-ethoxyethyl acetate, ketones such as methyl ethyl ketone and ethers such as diisopropyl ether are representative. The amounts and types of solvents used depend to a large extent on the viscosity and the rate of evaporation desired for the coating. Usually the amount of solvent added is such that the coating composition contains from about 20-60 percent by weight of the prepolymer.

A useful general discussion of moisture-cure coatings can be found in Chapter X of "Polyurethanes: Chemistry and Technology," Part II, Saunders and Frisch, Interscience Publishers, 1964. While much of this discussion relates to coatings based on aromatic polyisocyanates, it is largely applicable to coatings based on aliphatic polyisocyanates if allowances are made for the lower reactivity of aliphatic isocyanato groups.

Any of the substituted amidines described above for use in preparing foams can be used in moisture-cure coatings. The preferred catalysts are those described above as being preferred in preparing foams, i.e., those in which the radicals in one of the pairs $R_1$–$R_3$ or $R_2$–$R_3$ form a 5–7 membered ring and the radicals in one of the pairs $R_2$–$R_4$ or $R_1$–$R_5$ form a 5–9 membered ring as described above. The compounds 1,5-diazabicyclo[4.3.0]nonene-5 and 1,8-diazabicyclo[5.4.0]undecene-7 are especially preferred. The substituted amidines can be used in amounts of about 0.05 percent to 2.0 percent by weight, based on the total weight of the coating composition, i.e., prepolymer plus solvents to effectively accelerate the curing of moisture-cure coating compositions. The exact quantity of catalyst will vary depending on the particular coating composition, the humidity and temperature and the rate of cure desired. Preferred amounts range from 0.2 percent to 1.0 percent by weight of total coating composition. In the case of 1,5-diazabicyclo-[4.3.0]nonene-5, used at a level of 0.25 percent in a typical coating composition based on 4,4'-methylenebis(cyclohexyl isocyanate), the tack-free time is 39 minutes and the coating reaches a Sward Hardness of 32 in 24 hours at 75° F. (24° C.) and 50 percent relative humidity. The pot-life or workable life of this coating composition after the addition of the diazabicyclononene catalyst is about 20 hours. The catalysts of this invention should be added to the coating composition shortly before the coating is applied because the useful life of the coating composition is limited in the presence of the catalyst even in the absence of moisture.

Use of the substituted amidine catalysts in coating compositions of this invention greatly reduces the tack-free time of the coatings. The coatings thus become hard and resistant to marring in a much shorter time than do the coatings of the prior art. The coatings are particularly useful as nondiscoloring coverings for floors and finishes for wood.

The invention is illustrated by the following examples wherein parts and percentages are by weight unless indicated otherwise.

EXAMPLE 1

A mixture of 100 parts of a polyether polyol having an equivalent weight of about 1,250 (obtained by condensing propylene oxide with trimethylol propane and capping with ethylene oxide so that about 85 percent of the hydroxyl groups are primary, "Voranol CP-4601") and about 65.7 parts of a liquid mixture of stereoisomers of 4,4'-methylenebis-(cyclohexyl isocyanate) containing about 20 percent trans-trans isomer, 65 percent cis-trans isomer and 15 percent cis-cis isomer is prepared at room temperature in an agitated reactor. The mixture is heated to 100° C. and maintained at that temperature for about 3.5 hours. The resulting prepolymer is cooled to room temperature and stored in dry container until required. The prepolymer has an —NCO content of 10.5 percent and a Brookfield viscosity of about 2,000 cps. at 25° C.

A flexible foam is prepared from this prepolymer by a batch technique employing the following formulation:

| | | |
|---|---|---|
| Prepolymer of this example | 165.7 | parts |
| Methyl p-methoxybenzalmalonate | 1.6 | parts |
| Tri-isodecyl phosphite | 3.3 | parts |
| Dimethylformamide | 10.0 | parts |
| Surfactant, polydimethylsiloxane-polyalkylene ether block copolymer of the type described in Example 1 of Canadian Patent 669,881 | 0.18 | part |
| Water | 3.6 | parts |
| 1,5-Diazabicyclo[4.3.0]nonene-5 | 1.77 | parts |

The ingredients in the formulation are added to a container in the order listed and mixed together using a high speed laboratory mixer (about 3,000 RPM) for about 12 seconds. The resulting blend is poured into an open container and allowed to foam.

The foam has a "rise time" or "foam time" of about 125 seconds, and the cell structure is sufficiently open that no shrinkage is observed. The density of the foam is 2.2 lb./cu.ft. The cell size is in the range of 64 cells/linear inch. The compression set of this foam, and all other foams described hereinafter, is determined by ASTM-D-1564–64T, Method B, using conditions of 50 percent compression for 22 hours at 70° C. followed by 30 minute recovery. When the foam of this example is tested by this method after curing for 1 hour at 120° C., the compression set is 11 percent. Without any cure, the compression set is 24 percent. By hand tests, the tensile strength of this foam is comparable to that of a typical commercial foam of similar density derived from tolylene diisocyanate and polyoxypropyleneether triol having an equivalent weight of 1000.

When the procedure of this example is repeated with the exception that the 1.77 parts of 1,5-diazabicyclo[4.3.0]nonene-5 is replaced with 1.75 parts of 1,8-diazabicyclo[5.4.0]undecene-7 an open celled foam having 32–64 cells/linear inch and a density of 2.5 lb./cu. ft. is obtained. Without cure, this second foam has a compression set of 60 percent.

Substantially identical results are obtained when the above foams are prepared using 10 parts of tetramethylene sulfone in place of the 10 parts of dimethylformamide.

EXAMPLE 2

A prepolymer is prepared by mixing 100 parts of the polyether polyol described in Example 1 with about 56 parts of 3-isocyanatomethyl-3,5,5-trimethylcyclohexyl isocyanate and heating the resulting mixture for about 4.5 hours at 100° C. The prepolymer has an —NCO content of about 11.3 percent by weight. A foam is prepared by the procedure of Example 1 using the following formulation.

| | | |
|---|---|---|
| Prepolymer of this example | 156 | parts |
| Surfactant described in Example 1 | 0.18 | parts |
| Dimethylformamide | 10.0 | parts |
| Water | 3.6 | parts |
| 1,5-Diazabicyclo[4.3.0]nonene-5 | 1.56 | parts |

The rise time of this foam is about 130 seconds. It has open cells, sized about 32 cells/linear inch. The density is about 3 lb./cu.ft.

EXAMPLE 3

This example illustrates one-shot preparation of a foam based on an aromatic diisocyanate. The following formulation is used.

| | | |
|---|---|---|
| Polyether polyol, equivalent weight about 1000, obtained by condensing propylene oxide with trimethylol propane | 100.0 | parts |
| Surfactant, polydimethylsiloxane-polyalkyleneether block copolymer described in Example I (a) of U.S. 2,834,748 | 0.5 | part |
| Stannous di-2-ethylhexoate | 0.38 | part |
| 1,5-Diazabicyclo[4.3.0]nonene-5 | 0.104 | part |
| Water | 3.6 | parts |
| Tolylene diisocyanate (80% 2,4-isomer; 20% 2,6-isomer) | 45.4 | parts |

The ingredients are added to a container in the order listed, agitated vigorously for about 10 seconds and poured into an open container and allowed to foam. The rise time is about 80 seconds. The foam has a density of 2.0 lb./cu.ft., and open cells in the size range of 32–64 cells/linear inch. The compression set without curing is 19 percent.

Substantially the same results are obtained when the procedure is repeated using 0.15 part of triethylene diamine, a well known aromatic isocyanate foam catalyst, in place of the diazabicyclononene.

EXAMPLE 4

A mixture of about 75 parts of polyester polyol having an equivalent weight of about 1,000 and a functionality of about 2.7 (obtained by esterification of adipic acid with a mixture of diethylene glycol and trimethylolpropane) and 53.9 parts of the liquid mixture of isomers of 4,4'-methylenebis(cyclohexyl isocyanate) described in Example 1 is prepared at room temperature in an agitated reactor. The mixture is heated to 100° C. and maintained at that temperature for about 1 hour. The resulting product is cooled to room temperature and stored in dry containers until required. The prepolymer has an —NCO content of about 10.9 percent.

A flexible foam is prepared from this prepolymer by a quasi-prepolymer procedure using the following formulation.

| | | |
|---|---|---|
| Prepolymer of this example | 128.9 | parts |
| 4,4'-Methylenebis(cyclohexyl isocyanate) isomer mixture of Example 1 | 15.0 | parts |
| Polyester polyol of this example | 25.0 | parts |
| Silicone surfactant for flexible polyester foams sold by Union Carbide as "L–532." Described in Product Information Bulletin 50–6, "L–532, Silicone Surfactant for Polyester Urethane Foam Formation", February 1966, Union Carbide | 1.0 | part |
| Water | 3.6 | parts |
| 1,5-Diazabicyclo[4.3.0]-nonene-5 | 0.83 | part |

The ingredients are added in the order listed to a vessel and agitated vigorously for about 30 seconds and the resulting blend is poured into an open container and allowed to foam. The rise time is about 210 seconds. The resulting foam has a structure which is sufficiently open to prevent shrinkage. The density is 2.5 lb./cu.ft. and the cell size is in the range of 32 cells/linear inch. The compression set is 73 after curing 1 hour at 120° C.

EXAMPLE 5

A prepolymer is prepared for mixing 100.0 parts of the polyester polyol described in Example 4 with about 57.1 parts of 3-isocyanatomethyl-3,5,5-trimethylcyclohexyl isocyanate and heating the mixture for about 1 hour at 100° C. The prepolymer is cooled to room temperature. It has an —NCO content of 11.3 percent.

A foam is prepared from the prepolymer using the following formulation.

| | |
|---|---|
| Prepolymer of this example | 157.1 parts |
| Surfactant described in Example 4 | 1.0 part |
| Water | 3.6 parts |
| 1,5-Diazabicyclo[4.3.0]nonene-5 | 0.83 part |

The ingredients are added in the order listed to a suitable vessel, agitated vigorously for about 30 seconds and the resulting mixture poured into an open container and allowed to foam.

The rise time is about 155 seconds. The resulting foam has a density of 2.1 lb./cu.ft. The cell structure is very fine, 64 cells/linear inch, but sufficiently open to prevent shrinkage. The hand tensile is comparable to that of the commercial tolylene diisocyanate foam described in Example 1. The compression set is 92 percent after curing 1 hour at 120° C.

EXAMPLE 6

A foam is prepared by the quasi-prepolymer procedure described in Example 4 using the following formulation.

| | |
|---|---|
| Prepolymer of Example 4 | 128.4 parts |
| 4,4'-Methylenebis(cyclohexyl isocyanate) isomer mixture of Example 1 | 15.0 parts |
| Polyester polyol of Example 4 | 25.0 parts |
| Dimethylformamide | 15.0 parts |
| Surfactant described in Example 4 | 1.0 parts |
| Water | 3.6 parts |
| N'-Cyclohexyl-N-N-dimethyl-formamidine | 1.98 parts |

The rise time of this foam is about 120 seconds without shrinkage. The foam has a density of 2.6 lb./cu. ft. with an open cell structure having a cell size in the range of 32–64 cells/linear inch. It has a compression set of 58 percent after curing 1 hour at 120° C.

When the N'-cyclohexyl-N,N-dimethylformamidine in the formulation of this example is replaced with 3.4 parts of N'-decyl-N,N-dimethylformamidine and 5.0 parts of trichlorofluoromethane is added, a foam having a rise time of about 175 seconds is obtained. It has about 8 cells/linear inch and an open structure.

EXAMPLE 7

A polyester-based form is prepared by a batch one-shot procedure employing the following formulation.

| | |
|---|---|
| Polyester polyol of Example 4 | 95.0 parts |
| Activator solution I (prepared in advance) | |
| ⌈Polyester polyol of Example 4 | 5.0 parts |
| ⎢Dibutyltin di-2-ethylhexoate | 2.0 parts |
| ⎢Stannous di-2-ethylhexoate | 2.0 parts |
| ⌊Methylene chloride | 10.0 parts |
| Activator solution II (prepared in advance) | |
| ⌈Fomrez 77–86, Coupling Agent for Polyester Foams, Witco Bulletin No. F-6, March 1967, Witco Chemical Co. | 1.0 part |
| N-Ethyl morpholine | 0.4 part |
| ⌊Water | 2.5 parts |
| 1,5-Diazabicyclo[4.3.0]nonene-5 | 1.04 parts |
| 4,4'-Methylenebis(cyclohexyl isocyanate) isomer mixture of Example 1 | 50.0 parts |

Ingredients are added in the order listed to a suitable vessel, vigorously agitated for about 60 seconds and poured into an open container and allowed to foam. The rise time is about 150 seconds. The cell structure of the foam is open. It has a density of 2.8 lb./cu.ft. and about 32 cells/linear inch. The compression set without cure is 70 percent. The hand tensile strength of this foam is lower than that of similar foams prepared by prepolymer or quasi-prepolymer techniques.

EXAMPLE 8

A mixture of 468 parts of a polyether polyol having an equivalent weight of about 1,480 (obtained by condensing propylene oxide with trimethylol propane and capping with ethylene oxide so that about 85 percent of the hydroxyl groups are primary) and about 232 parts of the liquid mixture of isomers of 4,4'-methylenebis(cyclohexyl isocyanate) described in Example 1 is prepared at room temperature in an agitated reactor. The mixture is heated to 100° C. and maintained at that temperature for about 1 hour, then cooled and stored in dry containers until required. The prepolymer has an —NCO content of about 8.7 percent.

Foam is prepared continuously from this prepolymer by feeding the following streams in the proportions indicated to the mixing head of a foam machine such as those described in HR-32, "Metering and Mixing Equipment for the Production of Urethane Foam Products" by S. A. Stewart E. I. du Pont de Nemours and Company, Wilmington, Del. The temperatures of the streams are also indicated.

| | |
|---|---|
| Stream-1 (Temperature 46°C.) | |
| Prepolymer of this example | 100.0 parts |
| Methyl p-methoxybenzalmalonate | 1.0 part |
| Tri-isodecyl phosphite | 2.0 parts |
| Polydimethylsiloxane oil, 50 centistoke grade | 2.0 parts |
| | |
| Stream 2 (Temperature 31°C.) | |
| Water | 1.7 parts |
| N-Methyl-2-pyrrolidone | 6.0 parts |
| 1,5-Diazabicyclo[4.3.0]nonene-5 | 0.1 part |

The mixture issuing from the mixing head of the foam machine is directed into open containers and allowed to foam. The "rise time" or "foam time" for this formulation is 135 seconds. After standing for 7 days at 25° C. and 50 percent relative humidity, the foam has a density of 3.1 lb./cu.ft. and a tensile strength of 23 psi at a breaking elongation of 200 percent. The cell structure is uniform with fine open cells. The compression set without any cure is only 16 percent. The properties reported are measured in accordance with the methods of ASTM D-1564 for flexible polyurethane foams.

EXAMPLE 9

N'-n-decyl-N,N-dimethylformamidine is prepared as follows.

To a solution of 27.4 g. of N,N-dimethylformamide in 50 ml. of petroleum ether, stirred under nitrogen and cooled in ice, is added dropwise a solution of 23.1 g. of POCl$_3$ in 40 ml. of petroleum ether. The reaction mixture is allowed to stand overnight at room temperature. To this mixture is added dropwise a solution of 19.6 g. of n-decylamine in 40 ml. of petroleum ether. The reaction mixture is allowed to stand 2 days at room temperature. Two layers are formed and these are separated. To the lower layer a solution of 40 g. of sodium hydroxide in 500 ml. of water is added slowly. The resulting suspension is extracted with petroleum ether and the combined extracts are dried over potassium carbonate. Solvent is removed from the dry extract by evaporation under reduced pressure. The residue is then distilled under vacuum to obtain the product, bp. 98° C. at 0.04 mm. of Hg.

| | |
|---|---|
| Calc. for $C_{13}H_{28}N_2$: C, 73.3%; | H, 13.2%; N, 13.2% |
| Found: C, 73.7%; | H, 13.4%; N, 12.2% |

The other amidines can be prepared similarly.

In the following coating composition example, physical properties are measured as indicated below.

Sward Hardness — Sward Hardness Rocker, Official Digest, Federation of Paint and Varnish Production Clubs 26, 1030–1038 (1954). Standard Glass = 100.

Pencil Hardness — ibid., 28, 232 (1956).

Stress-Strain Properties — ASTM D-412 cross head speed = 2 inches/min.

EXAMPLE 10

To 112 parts of the 4,4'-methylenebis(cyclohexyl isocyanate) isomer mixture described in Example 1 is added a dry solution of 100 parts of polypropylene ether triol (equivalent weight 210, prepared by condensing propylene oxide with glycerol) in 318 parts of xylene. The mixture is heated at about 90° C. for about 4 hours until the theoretical NCO group assay of 3.02 percent by weight is reached. About 2 parts of 4,4'-butylidenebis(6-tert. butyl-m-cresol) and 2 parts of methyl-p-methoxybenzalmalonate are dissolved in the resulting coating composition as stabilizers.

To two portions of this coating composition, 1,5-diazabicyclo[4.3.0]nonene-5 is added in amounts of 0.25 percent and 0.50 percent by weight based on the total weight of coating composition. For comparison, 1.0 percent by weight of dibutyltin dilaurate is added to a third portion of the coating composition.

Drawn films of 3 mil wet thickness are prepared promptly from the 4 portions of catalyzed coating composition. The curing characteristics of the samples at 75° F. (24° C.) and 50 percent relative humidity are tabulated below:

| Catalyst | 1,5-Diazabicyclo-[4.3.0]nonene-5 | | Dibutyltin Dilaurate |
| --- | --- | --- | --- |
| Catalyst Level % | 0.25 | 0.50 | 1.0 |
| Estimated Pot Life | 22 hrs | <10 min. | >1 year |
| Tack-free time, min. | 39 | 8 | 90 |
| Sward Hardness, after tack-free | | | |
| Immediately | 10 | 18 | 4 |
| 1 hr. | — | 30 | 6 |
| 3 hrs. | 26 | 38 | 18 |
| 1 day | 32 | 40 | 28 |
| 3 days | — | 48 | 38 |
| Pencil Hardness, after tack-free | | | |
| Immediately | 6B | 4B | 6B |
| 1 hr. | 5B | 2B | 5B |
| 3 hrs. | 3B | B | 4B |
| 3 days | B | B | B |

Drawn films of 20 mil wet thickness are also prepared from the same 3 catalyzed coating compositions and cured for 1 week at 75° F. (24° C.) and 50 percent relative humidity. The physical properties of the resulting films are tabulated below.

| Catalyst | 1,5-Diazabicyclo-[4.3.0]nonene-5 | | Dibutyltin Dilaurate |
| --- | --- | --- | --- |
| Catalyst Level, % | 0.25 | 0.5 | 1.0 |
| Tensile Strength, psi. | 3940 | 4500 | 4315 |
| Elongation at Break, % | 115 | 125 | 120 |
| 100% Modulus, psi. | 3650 | 3415 | 4050 |

What is claimed is:

1. In a process for preparing a polyurethane/polyurea foam prepared by (1) reacting $x$ equivalents of an aliphatic polyisocyanate, wherein $x$ is about 2.0–10.5, with about one equivalent of a polyether or polyester polyol having an average equivalent weight of at least about 500 to prepare an isocyanato-terminated prepolymer, (2) adding to said prepolymer about 0–1 equivalent of a polyol of step (1), about 1–10 parts by weight of water per 100 parts of total polyol and $y$ equivalents of said aliphatic isocyanate, with the proviso that the total equivalents of aliphatic polyisocyanate used ($x + y$) provides about 0.7–1.3 isocyanato groups per equivalent of polyol plus water present; the improvement which consists essentially of carrying out the water-isocyanato group reaction in the presence of an amidine catalyst selected from the group consisting of 1,5-diazabicyclo-[4.3.0] nonene-5 and 1,8-diazabicyclo-[5.4.0] undecene-7.

2. A process of claim 1 wherein the organic polyisocyanate is 4,4'-methylenebis(cyclohexyl isocyanate) which is a liquid at 25° C.

3. A process of claim 1 wherein the polyol is a polyalkyleneether polyol having an average equivalent weight of about 900–2,000.

4. A process of claim 1 wherein $x$ is at least about 2–5, the polyol is a polyester polyol having an average equivalent weight of about 900–1,500, about 40–90 percent by weight of which is added in step (1) to prepare the prepolymer.

5. A process of claim 1 wherein the water is employed in the amount of about 2.5 parts by weight per 100 parts of polyol.

6. A process of claim 1 wherein the polyol is a polyalkyleneether polyol, substantially all of which is added in step (1) to prepare the prepolymer.

7. A process of claim 1 wherein the polyol has an average functionality of at least about 2.2 hydroxy groups per molecule, the polyisocyanate is 4,4'-methylenebis(cyclohexyl isocyanate) which is a liquid at about 25° C. and the catalyst is 1,5-diazabicyclo[ ]nonene-5.

8. A process of claim 7 wherein the polyol is a polyalkyleneether polyol substantially all of which is added in step (1) to prepare the prepolymer.

9. A process for covering a substrate with a moisture-cure polyurethane coating which consists essentially of applying to said substrate a solution of an aliphatic isocyanato-terminated polyurethane prepolymer in an inert solvent in combination with about 0.05–2.0 percent by weight, based on the total weight of the coating composition, of amidine catalyst selected from the group consisting of 1,5-diazabicyclo- [4.3.0] nonene-5 and 1,8-diazabicyclo-[5.4.0] undecene-7 and thereafter curing the coating by allowing the isocyanato groups to react with atmospheric moisture.

10. A process of claim 2 wherein the isocyanato-terminated polyurethane prepolymer is prepared by mixing about 1.4–2.1 equivalents of an aliphatic polyisocyanate with about 1 equivalent of at least one polyol having a functionality of about 2–4 and an average equivalent weight of about 90–560.

11. A process of claim 10 wherein the polyol is a mixture of a polyalkyleneether polyol and a non-polymeric polyol having a molecular weight below about 350.

12. A process of claim 2 wherein the aliphatic polyisocyanate is 4,4'-methylenebis(cyclohexyl isocyanate) which is a liquid at 25° C.

13. A process of claim 2 wherein the substituted amidine is N'-cyclohexyl-N,N-dimethylformamidine.

* * * * *